US012786105B2

(12) United States Patent
Beaudoin et al.

(10) Patent No.: US 12,786,105 B2
(45) Date of Patent: Nov. 3, 2026

(54) COMPUTING DEVICE COMPRISING A CONFIGURABLE ETHERNET RELAY FOR OPERATING IN BRIDGED OR ISOLATED MODE

(71) Applicant: Distech Controls Inc., Brossard (CA)

(72) Inventors: Daniel Beaudoin, Chambly (CA); Maxime Brunelle, Granby (CA)

(73) Assignee: Distech Controls Inc., Brossard (CA)

( * ) Notice: Subject to any disclaimer, the term of this patent is extended or adjusted under 35 U.S.C. 154(b) by 0 days.

(21) Appl. No.: 19/178,141

(22) Filed: Apr. 14, 2025

(65) Prior Publication Data

US 2026/0322735 A1 Oct. 15, 2026

(51) Int. Cl.
*H04L 45/00* (2022.01)
*H04L 45/30* (2022.01)
*H04L 45/302* (2022.01)

(52) U.S. Cl.
CPC .............. *H04L 45/22* (2013.01); *H04L 45/26* (2013.01); *H04L 45/30* (2013.01); *H04L 45/306* (2013.01)

(58) Field of Classification Search
CPC ....... H04L 45/22; H04L 45/24; H04L 45/243; H04L 45/247; H04L 45/26; H04L 45/28;
(Continued)

(56) References Cited

U.S. PATENT DOCUMENTS 8,107,363 B1 * 1/2012 Saluja ....................... H04L 1/22
709/236
8,300,539 B2 * 10/2012 Lee ....................... H04L 12/413
370/242
(Continued)

FOREIGN PATENT DOCUMENTS

CA 2747007 A1 * 7/2009 ........... H04L 45/745
CA 3121568 A1 * 6/2020 ......... H01R 13/7175
(Continued)

OTHER PUBLICATIONS

Notification of Transmittal of the International Search Report (PCT/ISA/210) and the Written Opinion (PCT/ISA/237) mailed Jun. 10, 2026, in corresponding International Application No. PCT/CA2026/050463. (11 pages).

*Primary Examiner* — Khanh Q Dinh
(74) *Attorney, Agent, or Firm* — Sikand IP Law PLLC

(57) ABSTRACT

Computing device comprising first and second Ethernet ports, an Ethernet relay configurable to operate in pass-through or forwarding mode, and a processing unit. In pass-through mode, the Ethernet relay electrically connects first and second Ethernet ports to one another. An Ethernet frame received via one of the first and second Ethernet ports is directly passed to the other one of the first and second Ethernet ports through the Ethernet relay. In forwarding mode, the Ethernet relay electrically isolates first and second Ethernet ports from one another. An Ethernet frame received via one of the first and second Ethernet ports is forwarded to the processing unit through the Ethernet relay. The processing unit determines an Ethernet configuration of the computing device, the Ethernet configuration being one of bridged or isolated mode. The processing unit configures the Ethernet relay to support the determined Ethernet configuration, even in absence of power.

19 Claims, 4 Drawing Sheets

(58) Field of Classification Search
CPC ... H04L 45/30; H04L 45/306; H04L 45/3065; H04L 45/36; H04L 45/38
USPC ................................. 709/220, 224–229, 238
See application file for complete search history.

(56) References Cited

U.S. PATENT DOCUMENTS

| | | | | |
|---|---|---|---|---|
| 9,497,133 | B2 * | 11/2016 | Srinivasan | H04L 47/24 |
| 9,866,483 | B2 * | 1/2018 | Smith | H04L 41/0663 |
| 9,998,361 | B2 * | 6/2018 | Kebler | H04L 67/1046 |
| 11,057,295 | B1 * | 7/2021 | Lin | H04L 12/4633 |
| 2007/0128899 | A1 * | 6/2007 | Mayer | G06F 9/4406 439/152 |
| 2012/0195190 | A1 * | 8/2012 | Singh | H04L 45/28 370/225 |
| 2015/0089037 | A1 * | 3/2015 | Tsirkin | H04L 47/32 709/223 |
| 2015/0172097 | A1 * | 6/2015 | Melman | H04L 41/0668 370/225 |
| 2016/0149822 | A1 * | 5/2016 | Bello | H04L 43/0882 370/237 |
| 2017/0063600 | A1 * | 3/2017 | Singh | H04L 12/18 |
| 2023/0216491 | A1 | 7/2023 | Goth et al. | |
| 2025/0267094 | A1 * | 8/2025 | Sikand | H04L 45/28 |

FOREIGN PATENT DOCUMENTS

| | | | | |
|---|---|---|---|---|
| CA | 3121569 | A1 * | 6/2020 | B65D 71/0022 |
| CN | 107272570 | A | 10/2017 | |
| CN | 117527729 | A | 2/2024 | |
| KR | 20110035623 | A | 4/2011 | |
| KR | 20140080059 | A | 6/2014 | |

* cited by examiner

COMPUTING DEVICE COMPRISING A CONFIGURABLE ETHERNET RELAY FOR OPERATING IN BRIDGED OR ISOLATED MODE

TECHNICAL FIELD

The present disclosure relates to the field of building automation. More specifically, the present disclosure presents a computing device comprising a configurable Ethernet relay for operating in bridged or isolated mode.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from sensors, and in turn determines set-points or command parameters to be sent to controlled appliances.

The environment controller usually comprises a plurality of communication interfaces for exchanging data with at least some of the sensors, the controlled appliances, user devices, configuration devices, other environment controllers, etc.

For instance, the environment controller comprises two Ethernet communication interfaces supporting the Ethernet protocol. Each Ethernet communication interface comprises an Ethernet port, allowing connection of the environment controller to an Ethernet segment via an Ethernet cable plugged into the Ethernet port.

Depending on current operating conditions, it is desirable to have the two Ethernet segments accessible via the two Ethernet ports of the environment controller be part of the same Ethernet network (bridged mode) or be seen as two separate Ethernet networks (isolated mode). However, in absence of power at the computing device, it is generally not possible to have the computing device continue to operate in the bridged mode.

Therefore, there is a need for a new computing device comprising a configurable Ethernet relay for operating in bridged or isolated mode.

SUMMARY

According to a first aspect, the present disclosure relates to a computing device comprising a first Ethernet port and a second Ethernet port. The computing device further comprises a configurable Ethernet relay adapted to operate in one of the following two modes: pass-though mode and forwarding mode. In the pass-through mode, the Ethernet relay is configured to electrically connect the first and second Ethernet ports to one another, An Ethernet frame received via one of the first and second Ethernet ports is directly passed to the other one of the first and second Ethernet ports through the Ethernet relay. In the forwarding mode, the Ethernet relay is configured to electrically isolate the first and second Ethernet ports from one another. An Ethernet frame received via one of the first and second Ethernet ports is forwarded to a processing unit through the Ethernet relay. The computing further comprises the processing unit. The processing unit determines an Ethernet configuration, the Ethernet configuration being one of a bridged mode and an isolated mode. If the configuration is the isolated mode, the processing unit configures the Ethernet relay to operate in the forwarding mode. upon reception of any Ethernet frame forwarded by the relay from the first Ethernet port, the processing unit does not forward the Ethernet frame to the second Ethernet port via the relay. Upon reception of any Ethernet frame forwarded by the relay from the second Ethernet port, the processing unit does not forward the Ethernet frame to the first Ethernet port via the relay. If the configuration is the bridged mode and power is available at the computing device, the processing unit configures the Ethernet relay to operate in the forwarding mode. Upon reception of an Ethernet frame forwarded by the relay from the first Ethernet port, the processing unit forwards the Ethernet frame to the second Ethernet port via the relay. Upon reception of an Ethernet frame forwarded by the relay from the second Ethernet port, the processing unit forwards the Ethernet frame to the first Ethernet port via the relay. If the configuration is the bridged mode and power is not available at the computing device, the processing unit configures the Ethernet relay to operate in the pass-through mode.

In a particular aspect, the Ethernet relay maintains its configuration to operate in pass-through or forwarding mode when power is not available at the computing device.

In another particular aspect, when the Ethernet configuration is the bridged mode and an Ethernet frame is received via the first Ethernet port from a first remote device connected to the first Ethernet port, the Ethernet frame is transmitted via the second Ethernet port to a second remote device connected to the second Ethernet port. In a particular embodiment, power is not available at the computing device.

In still another particular aspect, when the Ethernet configuration is the bridged mode and an Ethernet frame is received via the second Ethernet port from a second remote device connected to the second Ethernet port, the Ethernet frame is transmitted via the first Ethernet port to a first remote device connected to the first Ethernet port. In a particular embodiment, power is not available at the computing device.

In yet another particular aspect, when the Ethernet configuration is the isolated mode and an Ethernet frame is received via the first Ethernet port from a first remote device connected to the first Ethernet port, the Ethernet frame is not transmitted via the second Ethernet port to a second remote device connected to the second Ethernet port.

In another particular aspect, when the Ethernet configuration is the isolated mode and an Ethernet frame is received via the second Ethernet port from a second remote device connected to the second Ethernet port, the Ethernet frame is not transmitted via the first Ethernet port to a first remote device connected to the first Ethernet port.

In still another particular aspect, the Ethernet configuration is determined based on configuration data stored in a memory of the computing device, configuration data received from a user via a user interface of the computing device, or configuration data comprised in a control message received via one of the first Ethernet port, the second Ethernet port or another communication interface of the computing device.

In yet another particular aspect, the Ethernet configuration is the isolated mode and a determination is made by the processing unit to change the Ethernet configuration to the bridged mode.

In another particular aspect, the Ethernet configuration is the bridged mode and a determination is made by the processing unit to change the Ethernet configuration to the isolated mode.

In still another particular aspect, the Ethernet configuration is the bridged mode and the Ethernet relay is configured to operate in the forwarding mode, the processing unit determines that power is not available at the processing unit and configures the Ethernet relay to operate in the pass-through mode.

In yet another particular aspect, the processing unit applies a control voltage signal to the Ethernet relay to configure the Ethernet relay to operate in one of the pass-through and forwarding modes.

In another particular aspect, the processing unit sends a control command to a microcontroller of the computing device requiring the microcontroller to apply a control voltage signal to the Ethernet relay to configure the Ethernet relay to operate in one of the pass-through and forwarding modes.

In still another particular aspect, the Ethernet relay comprises at least one electrically conductive component moveable between a position where the first and second Ethernet ports are electrically connected to one another to operate the Ethernet relay in the pass-through mode and a position where the first and second Ethernet ports are electrically isolated from one another to operate the Ethernet relay in the forwarding mode. In a particular embodiment, the position of the at least one electrically conductive component is controlled by a control voltage signal applied to the Ethernet relay.

In yet another particular aspect, the computing device consists of an environment controller adapted to receive environmental characteristic values from sensors and to transmit control commands to controlled appliances.

In another particular aspect, the computing device is the first device in a daisy chain of devices, the computing device being connected to a next device in the daisy chain via one of the first and second Ethernet ports.

In another particular aspect, the computing device belongs to a daisy chain of devices, the computing device being connected to a previous device in the daisy chain via one of the first and second Ethernet ports, and being connected to a next device in the daisy chain via the other one of the first and second Ethernet ports.

BRIEF DESCRIPTION OF THE DRAWINGS

Embodiments of the disclosure will be described by way of example only with reference to the accompanying drawings, in which.

DETAILED DESCRIPTION

Figure 1:
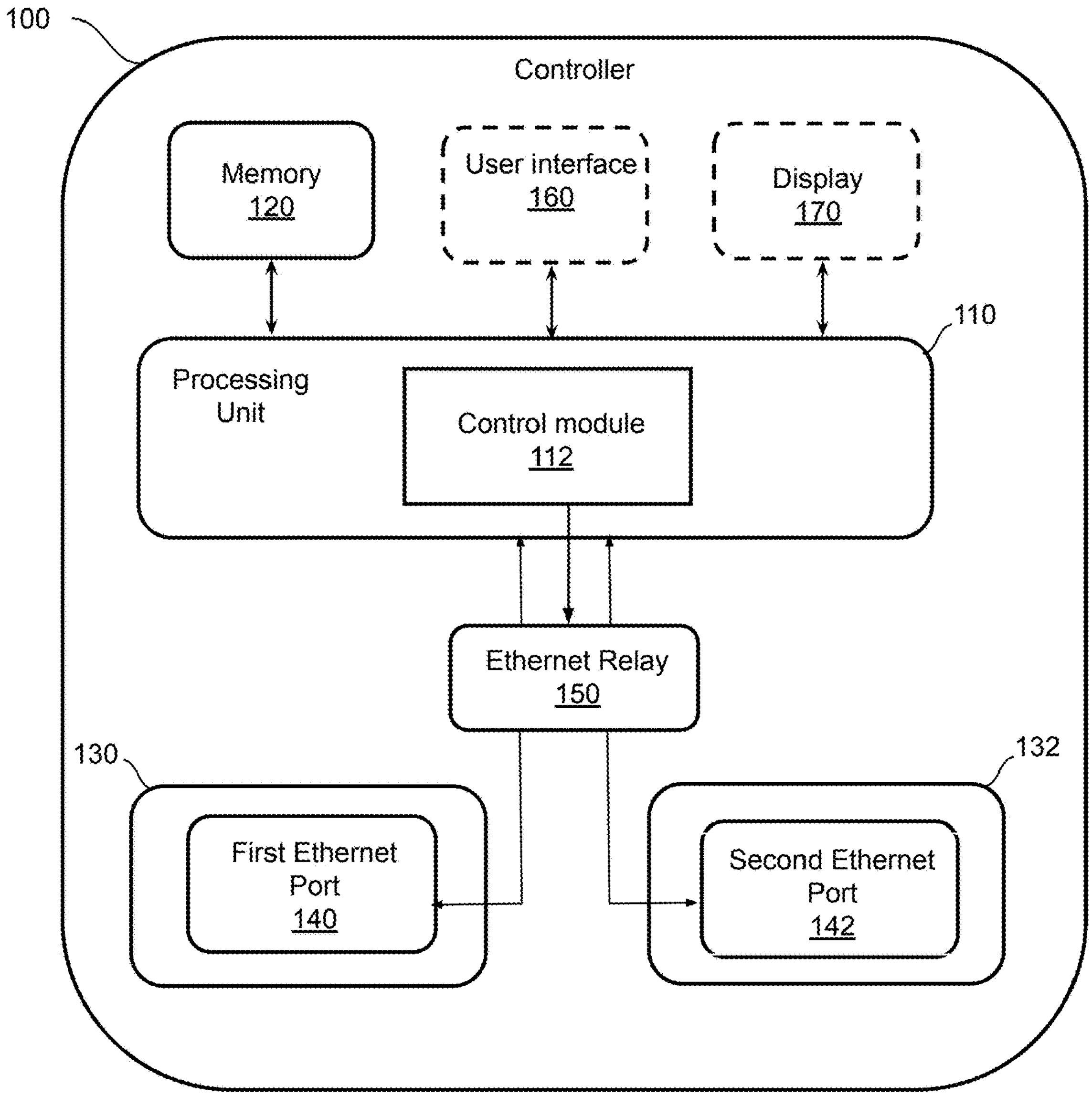
FIG. 1 represents a computing device comprising a configurable Ethernet relay for operating in bridged or isolated mode.

The foregoing and other features will become more apparent upon reading of the following non-restrictive description of illustrative embodiments thereof, given by way of example only with reference to the accompanying drawings.

Various aspects of the present disclosure generally address one or more of the problems related to the Ethernet configuration (bridged or isolated) of a computing device comprising two Ethernet ports (for instance in the context of an environment control system for a building, where the computing device is an environment controller). More particularly, the present disclosure aims at providing the capability to configure the computing device to operate the Ethernet ports in the bridged or isolated mode, through a configurable Ethernet relay included in the computing device. The Ethernet configuration of the computing device is enforced even in absence of power, by enforcing a proper configuration of the Ethernet relay (pass-through or forwarding).

The following terminology is used throughout the present specification:

Environment: condition(s) (temperature, pressure, oxygen level, light level, security, etc.) prevailing in a controlled zone or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment (a building). The environmental characteristic comprises any of the following: temperature, pressure, humidity, lighting, CO2, flow, radiation, water level, speed, sound; a variation of at least one of the following, temperature, pressure, humidity and lighting, CO2 levels, flows, radiations, water levels, speed, sound levels, etc., and/or a combination thereof.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

Reference is now made to FIG. 1, where FIG. 1 represents a computing device 100. For example, in the context of an environment control system, the computing device 100 is an environment controller 100 exchanging data with other environment control devices (ECDs), such as sensors, controlled appliances, etc. The environment controller 100 is responsible for controlling the environment of a zone of a building. The environment controller 100 receives from the sensors (e.g. from a thermal sensor) environmental characteristic values measured by the sensors. The environment controller 100 generates commands based on the received environmental characteristic values. The generated commands are transmitted to the controlled appliances, to control operations of the controlled appliances. The sensors and controlled appliances are not represented in FIG. 1 for simplification purposes.

The computing device 100 is not limited to an environment controller, but encompasses any type of device supporting a configurable Ethernet relay 150 for bridging Ethernet ports.

The computing device 100 comprises a processing unit 110, memory 120, a first communication interface 130, a second communication interface 132, and the configurable Ethernet relay 150. The computing device 100 may comprise additional components, such as another communication interface (not represented in FIG. 1 for simplification purposes), a user interface 160, a display 170, etc.

The processing unit 110 comprises one or more processors (not represented in FIG. 1) capable of executing instructions of a computer program. Each processor may further comprise one or several cores. The processing unit 110 executes a control module 112 and a switch module 114, as will be detailed later in the description.

The memory 120 stores instructions of computer program(s) executed by the processing unit 110 (for implementing the control module 112, the switch module 114, etc.), data generated by the execution of the computer program(s), data received via the communication interfaces 130 and 132 (or another communication interface), etc. Only a single memory 120 is represented in FIG. 1, but the computing device 100 may comprise several types of memories, including volatile memory (such as a volatile Random Access Memory (RAM), etc.) and non-volatile memory (such as a hard drive, electrically-erasable programmable read-only memory (EEPROM), flash, etc.).

The communication interfaces 130 and 132 allow the computing device 100 to exchange data with remote devices over a communication network (not represented in FIG. 1 for simplification purposes). For example, as mentioned previously, the computing device 100 is an environment controller exchanging data with sensors, controlled appliances, other environment controllers, etc., via the communication interfaces 130 and 132.

More specifically, the communication interfaces 130 and 132 are adapted to support the Ethernet protocol and to exchange data with remote devices over an Ethernet network. For simplification purposes, the communication interfaces 130 and 132 will be referred to as the first Ethernet interface 130 and the second Ethernet interface 132. Each Ethernet interface 130 and 132 usually comprises a combination of hardware and software executed by the hardware, for implementing the communication functionalities of the Ethernet interface.

The first Ethernet interface 130 comprises a first Ethernet port 140 and the second Ethernet interface 132 comprises a second Ethernet port 142. An Ethernet (communication) interface comprising an Ethernet port is well known in the art. The Ethernet port is adapted for receiving an Ethernet cable, providing a mechanical and electrical connection of the Ethernet cable to the Ethernet interface via the Ethernet port.

The configurable Ethernet relay 150 will be described later in relation to FIGS. 2, 3 and 4, and will now be referred to as the relay 150 for simplification purposes.

The optional user interface 160 and display 170 are components well known in the art, and will not be further detailed.

Figure 2:
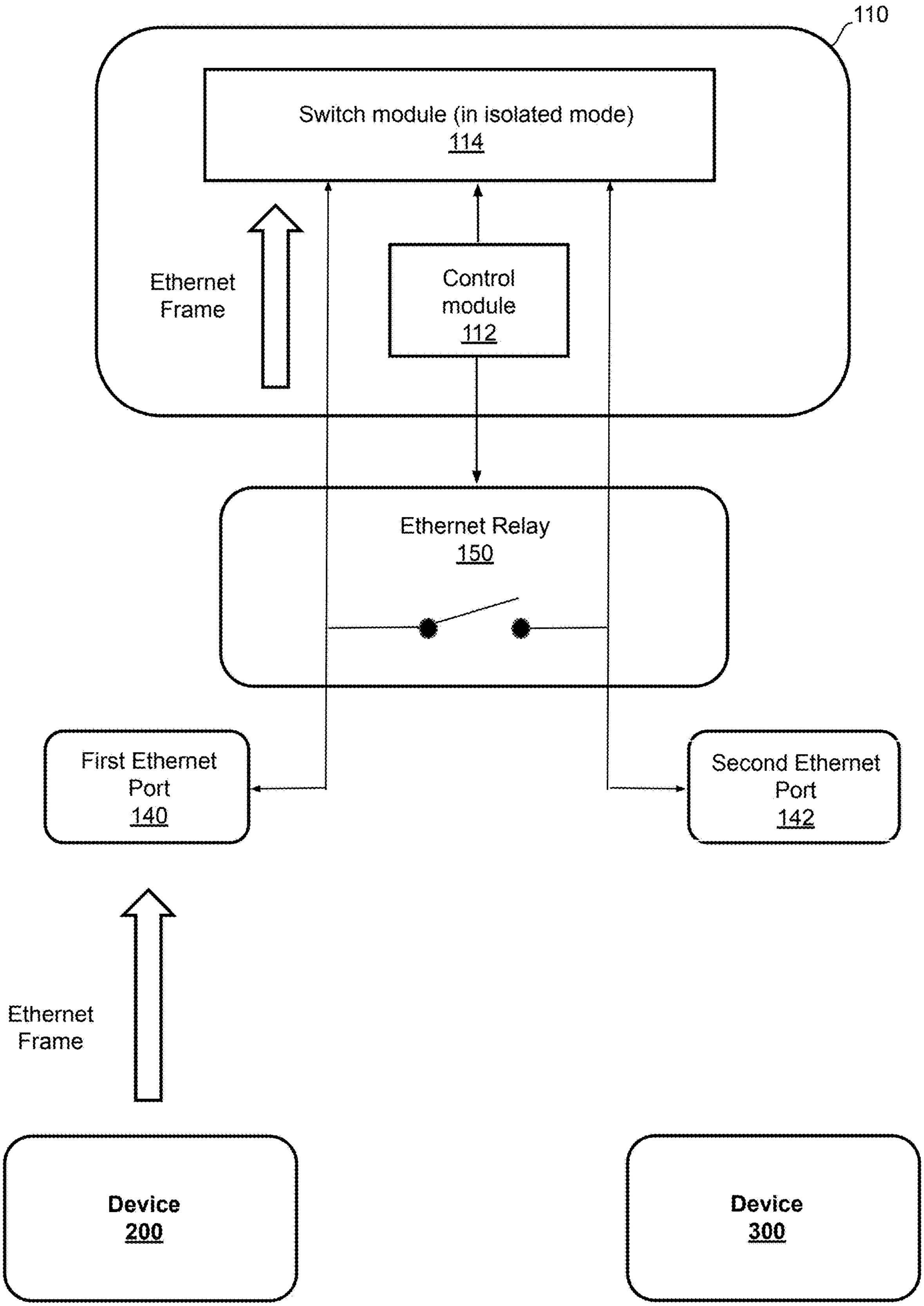
FIG. 2 represents the computing device configured to operate in isolated mode.
Figure 3:
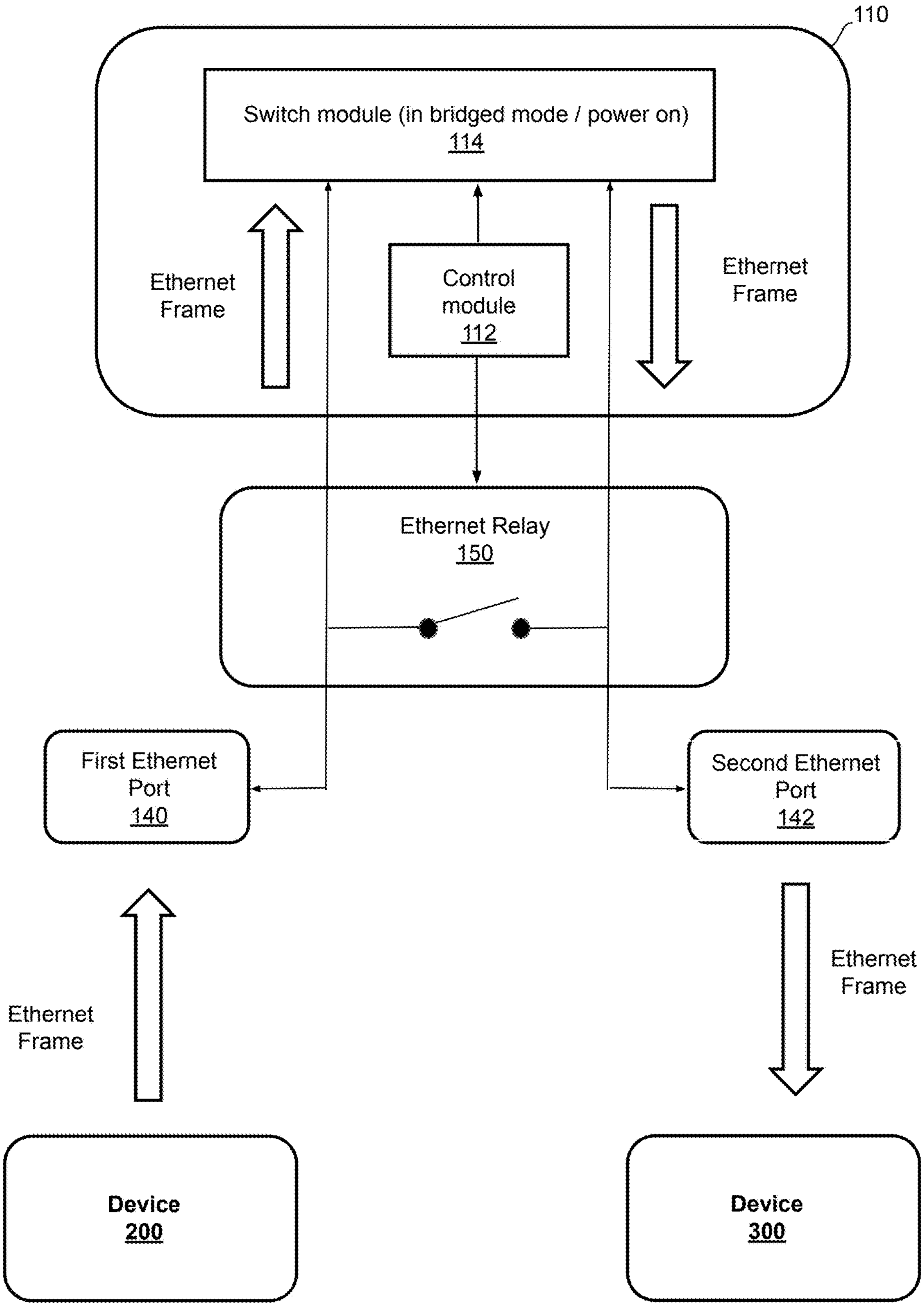
FIG. 3 represents the computing device configured to operate in bridged mode when power is available.
Figure 4:
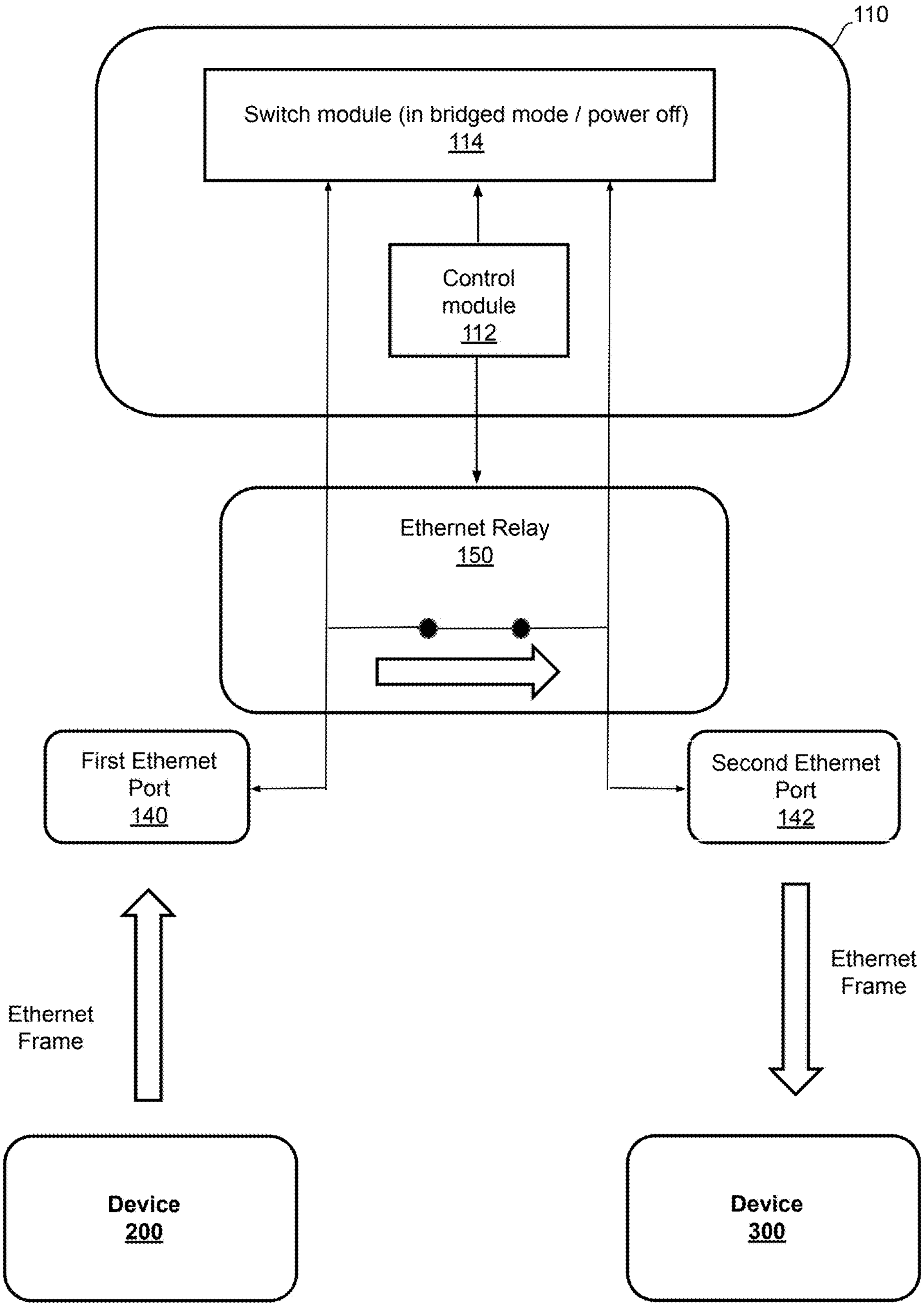
FIG. 4 represents the computing device configured to operate in bridged mode when power is not available.

Reference is now made concurrently to FIGS. 1, 2, 3 and 4, where FIG. 2 represents the computing device 100 with an Ethernet configuration set to isolated mode, while FIGS. 3 and 4 represent the computing device 100 with an Ethernet configuration set to bridged mode. The configuration of the relay 150 is adapted to support the Ethernet configuration of the computing device 100, as will be detailed in the following paragraphs. For simplification purposes, all the components of the computing device 100 are not represented in FIGS. 2, 3 and 4.

The Ethernet configuration of the computing device 100 is determined by the processing unit 110 (e.g. by the control module 112). The Ethernet configuration is one of bridged mode and isolated mode. The Ethernet configuration determined by the processing unit 110 is enforced via a switch module 114 and the relay 110.

FIGS. 2, 3 and 4 represent the switch module 114 being implemented by the processing unit 110. Alternatively, the switch module 114 is at least partially implemented by a standalone component of the computing device 100 (not represented in the Figures) positioned between the processing unit 110 and the relay 150 (interfacing the processing unit 110 with the relay 150).

The Ethernet ports 140 and 142 are connected to the relay 150, and the relay 150 is connected to the switch module 114.

In an exemplary implementation, the relay 150 is an electrically controlled bi-stable relay, which can be switched between a forwarding mode and a pass-through mode. The relay 150 is controlled by a (small) voltage signal, received directly from the processing unit 110 (e.g. from the control module 112) or from a microcontroller (not represented in the Figures) under the control of the processing unit 110. The relay is placed in one mode or the other (forwarding or pass-through) depending on the polarity of the control signal voltage. Furthermore, upon losing power at the computing device 100, the relay 150 maintains its configuration.

For instance, the relay 150 comprises an electromagnet and contacts (e.g. mechanically actuated plates). The electromagnet mechanically opens or closes the contacts, based on the applied control voltage signal. For example, the contacts are closed when a positive control voltage signal is applied and the contacts are opened when a negative control voltage signal is applied.

When the contacts are opened, the relay 150 is in the forwarding mode illustrated in FIGS. 2 and 3. The Ethernet ports 140 and 142 are electrically isolated from one another by the opened contacts of relay 150 (the contacts do not connect electrical wires of the Ethernet port 140 with electrical wires of the Ethernet port 142). Electrical signals received by the Ethernet port 140 are not passed to the Ethernet port 142 and electrical signals received by the Ethernet port 142 are not passed to the Ethernet port 140.

When the contacts are closed, the relay 150 is in the by-pass mode illustrated in FIG. 4. The Ethernet ports 140 and 142 are electrically connected to one another through the closed contacts of the relay 150 (the contacts connect electrical wires of the Ethernet port 140 with electrical wires of the Ethernet port 142). Electrical signals received by the Ethernet port 140 are passed to the Ethernet port 142 and electrical signals received by the Ethernet port 142 are passed to the Ethernet port 140.

When configured to operate in the forwarding mode, an Ethernet frame received via the first Ethernet port 140 is forwarded by the relay 150 to the switch module 114 (as illustrated in FIGS. 2 and 3). Similarly, an Ethernet frame received via the second Ethernet port 142 is forwarded by the relay 150 to the switch module 114 (not illustrated in FIGS. 2 and 3 for simplification purposes).

When configured to operate in the pass-through mode, an Ethernet frame received via the first Ethernet port 140 is directly passed by the relay 150 to the second Ethernet port 142 (as illustrated in FIG. 4). Similarly, an Ethernet frame received via the second Ethernet port 142 is directly passed by the relay 150 to the first Ethernet port 140 (not illustrated in FIG. 4 for simplification purposes).

Other implementations of the relay 150 are within the scope of the present disclosure. The relay 150 generally comprises electrically conductive component(s) (e.g. the aforementioned contacts), which can be moved between a position where the Ethernet ports 140 and 142 are electrically connected to one another (pass-through mode) and a position where the Ethernet ports 140 and 142 are electrically isolated from one another (forwarding mode). Actuation of the moveable component(s) is generally controlled by the aforementioned control voltage signal applied to the relay 150.

Furthermore, the relay 150 may be implemented by a plurality of relaying components. Each relaying component is adapted to pass (pass-through mode) some of the electrical signals between the Ethernet ports 140 and 142 or prevent (forwarding mode) some of the electrical signals to pass between the Ethernet ports 140 and 142. For example, each relaying component is configurable to electrically connect or electrically isolate one electrical wire of the first Ethernet port 140 and one electrical wire of the second Ethernet port 142.

Reference is now made more specifically to FIG. 2, illustrating the Ethernet configuration determined by the processing unit 110 being isolated mode.

For example, the Ethernet configuration is determined by the control module 112. The control module 112 further configures the relay 150 to operate in the forwarding mode and the switch module 114 to operate in the isolated mode.

As mentioned previously, when operating in forwarding mode, the relay 150 electrically isolates the first (140) and second (142) Ethernet ports from one another. Any Ethernet frame received via the first Ethernet port 140 or the second Ethernet port 142 is forwarded by the relay 150 to the switch module 114.

Upon reception of any Ethernet frame forwarded by the relay 150 from the first Ethernet port 140, the switch module 114 does not forward the Ethernet frame to the second Ethernet port 142 via the relay 150. If the destination of the Ethernet frame is the computing device 100 (based on a destination Media Access Control (MAC) address in the Ethernet frame), the Ethernet frame is processed by the processing unit 110. For example, upper layer protocols (e.g. the Internet Protocol (IP) layer) embedded in the Ethernet frame are processed by the processing unit 110. Otherwise, the Ethernet frame is simply dropped.

Upon reception of any Ethernet frame forwarded by the relay 150 from the second Ethernet port 142, the switch module 114 does not forward the Ethernet frame to the first Ethernet port 140 via the relay 150. If the destination of the Ethernet frame is the computing device 100, the Ethernet frame is processed by the processing unit 110. Otherwise, the Ethernet frame is simply dropped.

As illustrated in FIG. 2, an Ethernet frame received via the Ethernet port 140 from a computing device 200 connected to the Ethernet port 140, is not forwarded to Ethernet port 142 (through the relay 150 and switch module 114), and is not transmitted via the Ethernet port 142 to a computing device 300 connected to the Ethernet port 142.

Similarly, although not represented in FIG. 2 for simplification purposes, an Ethernet frame received via the Ethernet port 142 from the computing device 300 connected to the Ethernet port 142, is not forwarded to Ethernet port 140 (through the relay 150 and switch module 114), and is not transmitted via the Ethernet port 140 to the computing device 200 connected to the Ethernet port 140.

Reference is now made more specifically to FIG. 3, illustrating the Ethernet configuration determined by the processing unit 110 being bridged mode and power being available at the computing device 100.

For example, the Ethernet configuration is determined by the control module 112. The control module 112 further configures the relay 150 to operate in the forwarding mode and the switch module 114 to operate in the bridged mode.

As mentioned previously, when operating in forwarding mode, the relay 150 electrically isolates the first (140) and second (142) Ethernet ports from one another. Any Ethernet frame received via the first Ethernet port 140 or the second Ethernet port 142 is forwarded by the relay 150 to the switch module 114.

Upon reception of an Ethernet frame forwarded by the relay 150 from the first Ethernet port 140, the switch module 114 determines the destination of the Ethernet frame (based on a destination MAC address in the Ethernet frame). If the destination of the Ethernet frame is the computing device 100, the Ethernet frame is processed by the processing unit 110. Otherwise, the Ethernet frame is forwarded to the second Ethernet port 142 via the relay 150.

Upon reception of an Ethernet frame forwarded by the relay 150 from the second Ethernet port 142, the switch module 114 determines the destination of the Ethernet frame. If the destination of the Ethernet frame is the computing device 100, the Ethernet frame is processed by the processing unit 110. Otherwise, the Ethernet frame is forwarded to the first Ethernet port 140 via the relay 150.

As illustrated in FIG. 3, an Ethernet frame received via the Ethernet port 140 from the computing device 200 connected to the Ethernet port 140, is forwarded to Ethernet port 142 (through the relay 150 and switch module 114), and is transmitted via the Ethernet port 142 to the computing device 300 connected to the Ethernet port 142.

Similarly, although not represented in FIG. 3 for simplification purposes, an Ethernet frame received via the Ethernet port 142 from the computing device 300 connected to the Ethernet port 142, is forwarded to Ethernet port 140 (through the relay 150 and switch module 114), and is transmitted via the Ethernet port 140 to the computing device 200 connected to the Ethernet port 140.

Reference is now made more specifically to FIG. 4, illustrating the Ethernet configuration determined by the processing unit 110 being bridged mode and power not being available at the computing device 100.

For example, the Ethernet configuration is determined by the control module 112. The control module 112 further configures the relay 150 to operate in the pass-through mode. The configuration of the relay 150 is performed before losing power. When power is effectively lost, the switch module 140 is no longer operational since the processing unit 110 does not receive power. However, the relay 150 maintains its configuration in pass-through mode even when power is not available.

As mentioned previously, when operating in pass-through mode, the relay 150 electrically connects the first (140) and second (142) Ethernet ports to one another. Any Ethernet frame received via the first Ethernet port 140 is passed to the second Ethernet port 142 through the relay 150. Any Ethernet frame received via the second Ethernet port 142 is passed to the first Ethernet port 140 through relay 150.

As illustrated in FIG. 4, an Ethernet frame received via the Ethernet port 140 from the computing device 200 connected to the Ethernet port 140, is passed to Ethernet port 142 (directly through the relay 150), and is transmitted via the Ethernet port 142 to the computing device 300 connected to the Ethernet port 142.

Similarly, although not represented in FIG. 4 for simplification purposes, an Ethernet frame received via the Ethernet port 142 from the computing device 300 connected to the Ethernet port 142, is passed to Ethernet port 140 (directly through the relay 150), and is transmitted via the Ethernet port 140 to the computing device 200 connected to the Ethernet port 140.

Referring simultaneously to FIGS. 3 and 4, the Ethernet frame received from the computing device 200 and transmitted to the computing device 300 through the computing device 100, is either processed (the upper layer protocols embedded in the Ethernet frame) by the computing device 300 or further transmitted by the computing device 300 to still another computing device (not represented in the Figures).

Similarly (although not represented in the Figures for simplification purposes), an Ethernet frame received from the computing device 300 and transmitted to the computing device 200 through the computing device 100, is either processed (the upper layer protocols embedded in the Ethernet frame) by the computing device 200 or further transmitted by the computing device 200 to still another computing device (not represented in the Figures).

In an exemplary configuration, the computing device 100 belongs to a daisy chain. For example, the computing device 100 is the first device in the daisy chain, and is connected via one of the Ethernet ports 140 and 142 to a next device in the daisy chain (e.g. the next device in the daisy chain is computing device 300 reachable via Ethernet port 142). Alternatively, the computing device 100 is not the first device in the daisy chain. The computing device 100 is connected via one of the Ethernet ports 140 and 142 to a previous device in the daisy chain (e.g. the previous device is computing device 200 reachable via Ethernet port 140), and is connected via the other one of the Ethernet ports 140 and 142 to a next device in the daisy chain (e.g. the next device is computing device 300 reachable via Ethernet port 142).

Although not represented in the Figures for simplifications purposes, the computing device 100 comprises at least one component providing electrical power to other components (e.g. the processing unit 110, the memory 120, the Ethernet interfaces 130 and 132, etc.) of the computing device 100. Examples of components providing electrical power to the computing device 100 include a power supply connectable to a power grid, a battery, etc.

As mentioned previously, when the Ethernet configuration is the bridged mode and power is available at the computing device 100, the Ethernet relay 150 is configured to operate in the forwarding mode. An event triggers a determination by the processing unit 110 that power is not available at the computing device 100 (or more specifically that power is about to become unavailable). Following the detection of (imminent) unavailability of power, the processing unit 110 (e.g. control module 112) configures the Ethernet relay 150 to operate in the pass-through mode. The configuration of the relay 150 in the pass-through mode occurs before effectively losing power, or at least when there is still enough power to perform the configuration of the relay 150. The event (detectable by the processing unit 110) representative of a loss of power occurring (or about to occur) at the computing device 100 is out of the scope of the present disclosure. When power is restored at the computing device 100, the control module 112 reconfigures the relay 150 to operate in the forwarding mode (the pass-through mode of the relay 150 is only used in absence of power).

The switch module 114 is not operational when power is not available at the computing device 100. However, when the relay 150 is configured in the pass-through mode and no power is available at the computing device 100 (e.g. power grid not supplying power to the power supply, battery empty, etc.), the relay 150 is still capable of relaying Ethernet frames. More specifically, even without power at the computing device 100, an Ethernet frame received via the Ethernet port 140 is passed to Ethernet port 142 through the relay 150, and transmitted via the Ethernet port 142. Similarly, an Ethernet frame received via the Ethernet port 142 is passed to Ethernet port 140 through the relay 150, and transmitted via the Ethernet port 140.

Following are examples of an implementation of the determination of the Ethernet configuration (bridged mode or isolated mode) by the processing unit 110 (e.g. by the control module 112). The following examples are for illustration purposes only and are not limitative. In an exemplary implementation, the Ethernet configuration is determined based on configuration data stored in the memory 120 of the computing device 100. For instance, when the computing device 100 is powered up, the Ethernet configuration (bridged mode or isolated mode) is read from a configuration file stored in the memory 120.

In another exemplary implementation, the Ethernet configuration is determined based on configuration data received from a user via the user interface 160 of the computing device 100. For instance, a graphical user interface is displayed on the display 170 of the computing device 100, allowing the user to choose between the bridged mode and the isolated mode via the user interface 160. The choice of the user is received and processed by the processing unit 110, to determine the Ethernet configuration.

In still another exemplary implementation, the Ethernet configuration is determined based on configuration data included in a control message received via one of the first Ethernet port 140, the second Ethernet port 142, or another communication interface of the computing device 100 (not represented in the Figures for simplification purposes). For instance, the processing unit 110 processes the control message to extract configuration data (e.g. bridged mode or isolated mode), and the Ethernet configuration is set accordingly.

In an exemplary sequence, the processing unit 110 (e.g. the control module 112) initially sets the Ethernet configuration to bridged mode via a configuration file. The processing unit 110 then sets the Ethernet configuration to isolated mode based on a user interaction with the user interface 160 or a received control message. The processing unit 110 further sets the Ethernet configuration back to bridged mode based on another user interaction with the user interface 160 or another received control message.

In another exemplary sequence, the processing unit 110 (e.g. the control module 112) initially sets the Ethernet configuration to isolated mode via a configuration file. The processing unit 110 then sets the Ethernet configuration to bridged mode based on a user interaction with the user interface 160 or a received control message. The processing unit 110 further sets the Ethernet configuration back to isolated mode based on another user interaction with the user interface 160 or another received control message.

Following are examples of an implementation of the configuration by the processing unit 110 (e.g. by the control module 112) of the relay 150 to operate in one of the forwarding and the by-pass modes. The following examples are for illustration purposes only and are not limitative. In an exemplary implementation, the processing unit 110 controls directly the relay 150. For instance, the processing unit 110 applies a control voltage signal to the relay 150, to configure the relay 150 in the forwarding or the by-pass mode.

In another exemplary implementation, the processing unit 110 indirectly controls the relay 150, for example through a microcontroller (not represented in the Figures for simplification purposes). The processing unit 110 sends a control command to the microcontroller, requiring the microcontroller to apply a control voltage signal to the relay 150, to configure the relay 150 in the forwarding or the by-pass mode.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A computing device comprising:

a first Ethernet port;

a second Ethernet port;

a configurable Ethernet relay adapted to operate in one of the following two modes:

a pass-through mode where the Ethernet relay is configured to electrically connect the first and second Ethernet ports to one another, an Ethernet frame received via one of the first and second Ethernet ports being directly passed to the other one of the first and second Ethernet ports through the Ethernet relay; and a forwarding mode where the Ethernet relay is configured to electrically isolate the first and second Ethernet ports from one another, an Ethernet frame received via one of the first and second Ethernet ports being forwarded to a processing unit through the Ethernet relay; and the processing unit adapted to:

determine an Ethernet configuration, the Ethernet configuration being one of a bridged mode and an isolated mode;

if the configuration is the isolated mode:

configure the Ethernet relay to operate in the forwarding mode;

upon reception of any Ethernet frame forwarded by the relay from the first Ethernet port, do not forward the Ethernet frame to the second Ethernet port via the relay; and upon reception of any Ethernet frame forwarded by the relay from the second Ethernet port, do not forward the Ethernet frame to the first Ethernet port via the relay;

if the configuration is the bridged mode and power is available at the computing device:

configure the Ethernet relay to operate in the forwarding mode;

upon reception of an Ethernet frame forwarded by the relay from the first Ethernet port, forward the Ethernet frame to the second Ethernet port via the relay; and upon reception of an Ethernet frame forwarded by the relay from the second Ethernet port, forward the Ethernet frame to the first Ethernet port via the relay; and if the configuration is the bridged mode and power is not available at the computing device:

configure the Ethernet relay to operate in the pass-through mode.

2. The computing device of claim 1, wherein the Ethernet relay maintains its configuration to operate in pass-through or forwarding mode when power is not available at the computing device.

3. The computing device of claim 1, wherein when the Ethernet configuration is the bridged mode and an Ethernet frame is received via the first Ethernet port from a first remote device connected to the first Ethernet port, the Ethernet frame is transmitted via the second Ethernet port to a second remote device connected to the second Ethernet port.

4. The computing device of claim 3, wherein power is not available at the computing device.

5. The computing device of claim 1, wherein when the Ethernet configuration is the bridged mode and an Ethernet frame is received via the second Ethernet port from a second remote device connected to the second Ethernet port, the Ethernet frame is transmitted via the first Ethernet port to a first remote device connected to the first Ethernet port.

6. The computing device of claim 5, wherein power is not available at the computing device.

7. The computing device of claim 1, wherein when the Ethernet configuration is the isolated mode and an Ethernet frame is received via the first Ethernet port from a first remote device connected to the first Ethernet port, the Ethernet frame is not transmitted via the second Ethernet port to a second remote device connected to the second Ethernet port.

8. The computing device of claim 1, wherein when the Ethernet configuration is the isolated mode and an Ethernet frame is received via the second Ethernet port from a second remote device connected to the second Ethernet port, the Ethernet frame is not transmitted via the first Ethernet port to a first remote device connected to the first Ethernet port.

9. The computing device of claim 1, wherein the Ethernet configuration is determined based on configuration data stored in a memory of the computing device, configuration data received from a user via a user interface of the computing device, or configuration data comprised in a control message received via one of the first Ethernet port, the second Ethernet port or another communication interface of the computing device.

10. The computing device of claim 1, wherein the Ethernet configuration is the isolated mode and a determination is made by the processing unit to change the Ethernet configuration to the bridged mode.

11. The computing device of claim 1, wherein the Ethernet configuration is the bridged mode and a determination is made by the processing unit to change the Ethernet configuration to the isolated mode.

12. The computing device of claim 1, wherein the Ethernet configuration is the bridged mode and the Ethernet relay is configured to operate in the forwarding mode, the processing unit determines that power is not available at the processing unit and configures the Ethernet relay to operate in the pass-through mode.

13. The computing device of claim 1, wherein the processing unit applies a control voltage signal to the Ethernet relay to configure the Ethernet relay to operate in one of the pass-through and forwarding modes.

14. The computing device of claim 1, wherein the processing unit sends a control command to a microcontroller of the computing device requiring the microcontroller to apply a control voltage signal to the Ethernet relay to configure the Ethernet relay to operate in one of the pass-through and forwarding modes.

15. The computing device of claim 1, wherein the Ethernet relay comprises at least one electrically conductive component moveable between a position where the first and second Ethernet ports are electrically connected to one another to operate the Ethernet relay in the pass-through mode and a position where the first and second Ethernet ports are electrically isolated from one another to operate the Ethernet relay in the forwarding mode.

16. The computing device of claim 15, wherein the position of the at least one electrically conductive component is controlled by a control voltage signal applied to the Ethernet relay.

17. The computing device of claim 1, consisting of an environment controller adapted to receive environmental characteristic values from sensors and to transmit control commands to controlled appliances.

18. The computing device of claim 1, being the first device in a daisy chain of devices, the computing device being connected to a next device in the daisy chain via one of the first and second Ethernet ports.

19. The computing device of claim 1, belonging to a daisy chain of devices, the computing device being connected to a previous device in the daisy chain via one of the first and second Ethernet ports, and being connected to a next device in the daisy chain via the other one of the first and second Ethernet ports.

* * * * *